(12) United States Patent  (10) Patent No.: US 7,958,156 B2
Shriwas et al.  (45) Date of Patent: Jun. 7, 2011

(54) GRAPHICAL/RICH MEDIA ADS IN SEARCH RESULTS

(75) Inventors: Rajendra Shriwas, Fremont, CA (US); Kashyap Lodhiya, Santa Clara, CA (US)

(73) Assignee: Yahoo!, Inc., Sunnyvale, CA (US)

( * ) Notice: Subject to any disclaimer, the term of this patent is extended or adjusted under 35 U.S.C. 154(b) by 483 days.

(21) Appl. No.: 12/037,039

(22) Filed: Feb. 25, 2008

(65) Prior Publication Data

US 2009/0216744 A1  Aug. 27, 2009

(51) Int. Cl.
*G06F 7/00* (2006.01)
*G06F 17/30* (2006.01)

(52) U.S. Cl. ........... 707/796; 707/805; 715/201; 725/42

(58) Field of Classification Search .......... 707/600–831; 705/14.4, 14.41, 14.49, 14.68, 14.69, 14.72; 715/747, 748, 763, 835, 836, 201, 738, 744; 725/40, 42, 47, 43, 44
See application file for complete search history.

(56) References Cited

U.S. PATENT DOCUMENTS

| | | | | |
|---|---|---|---|---|
| 6,968,507 | B2 * | 11/2005 | Pennell et al. | 715/781 |
| 6,985,934 | B1 * | 1/2006 | Armstrong et al. | 709/219 |
| 2003/0093285 | A1 * | 5/2003 | Colace et al. | 705/1 |
| 2004/0003097 | A1 * | 1/2004 | Willis et al. | 709/228 |
| 2006/0149625 | A1 * | 7/2006 | Koningstein | 705/14 |
| 2006/0248110 | A1 * | 11/2006 | Lynn et al. | 707/102 |
| 2007/0112630 | A1 * | 5/2007 | Lau et al. | 705/14 |
| 2007/0204314 | A1 * | 8/2007 | Hasek et al. | 725/100 |
| 2008/0004956 | A1 * | 1/2008 | Atherton et al. | 705/14 |
| 2009/0150797 | A1 * | 6/2009 | Burkholder et al. | 715/747 |

OTHER PUBLICATIONS

Dedrick, Interactive electronic advertising, Jul. 13-14, 1994, IEEE, 55-66.*
Takami et al, Support system of advertising distribution contract for media-mix strategy, Sep. 15-15, 2004, IEEE, 122-125.*

* cited by examiner

*Primary Examiner* — Jean B Fleurantin
(74) *Attorney, Agent, or Firm* — Martine Penilla & Gencarella, LLP (57) ABSTRACT

A method and system for mixing rich media content with textual listing on a webpage includes receiving a plurality of advertisement parameters associated with an advertisement from an advertiser. The advertisement parameters define the advertisement and are used for booking the advertisement. Additional media content associated with the advertisement is obtained from the advertiser. The additional media content includes rich media content. A dynamic content window is defined for rendering the additional media content. A graphical icon is provided for the advertisement to indicate that additional media content is available for the advertisement. The graphical icon is activated through a control or is activated by default. The graphical icon is associated with the dynamic content to provide access to the additional media content on the webpage in response to detecting a user action at the graphical icon.

21 Claims, 9 Drawing Sheets

GRAPHICAL/RICH MEDIA ADS IN SEARCH RESULTS

BACKGROUND

1. Field of the Invention

The present invention relates to internet advertising, and more particularly, to providing rich media ads in search results to enrich a user's search experience.

2. Description of the Related Art

The computing industry has seen many advances in recent years, and such advances have lead to the rapid development of internet marketing and internet commerce. Due to the availability and growing popularity of internet marketing, advertisers and publishers have resorted to internet advertising for marketing their products or services. Internet advertising provides a number of advantages over traditional methods of advertising. It is a great marketing tool as it provides low cost advertising and greater flexibility in reaching out to a global audience. For an advertiser or publisher, internet advertising gives the opportunity to precisely target their audience and to customize the advertisements to each consumer's geographical region, interest, preference, taste, etc. Internet advertising also enables an advertiser or publisher to analyze the effectiveness of an advertisement by tracking user interaction with their advertisements. For a consumer, Internet advertising provides more direct interaction and provides easy and convenient access to wide array of products and services resulting in hassle-free shopping experience.

Internet advertising is normally presented to a user on a search page. A user looking for a certain product or service, uses the internet as a searching tool to search for the product and/or service. The user enters one or more search parameters into a search engine. The search engine searches the available inventory on the internet and returns a list of search results that match the entered search criteria. The search result is presented to the user in a search result page. A host of the search engine may allow a plurality of advertisers to advertise products, services or present informational messages alongside the search results on the search page in the form of sponsored advertisements with active links. These advertisements (ads) may be based on the search criteria or may include random advertisements. Most of the ads that are currently available on the web page are text based. With a text based ad, the amount of information an advertiser may be able to display in the ad is very limited due to the number of ads and limited amount of space available for each ad on the search result page. The advertiser may be able to overcome the space constraint by booking a larger space on the search page for displaying the ads. However, this might reduce the number of advertisements displayed on the search result page.

When an advertiser wants to provide additional information on a service or product, the advertiser has to place it within a sponsored link accessible to a user. Usually the sponsored link will take a user to a home page of the advertiser or to a web page that the advertiser has linked to the advertisement. These web pages are fairly static in nature and do not provide the ability to add content easily. Even if content is added to the home page or linked page, the user has to wade through the textual information provided in the home page or the linked page to get to additional information. Moreover, the additional information may not be based on the content of the advertisement, in which case rendering the additional information becomes challenging.

It is in this context that embodiments of the invention arise.

SUMMARY

Embodiments of the present invention provide methods and computer implemented systems that enable mixing rich media content with textual listings on a webpage. An advertisement with additional media content to render on a webpage is identified and a graphical icon is provided for the advertisement to indicate the availability of the additional media content. A dynamic content window for rendering the additional media content is defined and associated with the graphical icon for the advertisement. The graphical icon provides access to the additional media content upon detection of a user action at the graphical icon. The graphical icon, thus, provides a tool that allows an advertiser/publisher to introduce rich media based advertisements aside from text based advertisements. The graphical icon uses very minimal "real-estate" space on the webpage while providing access to rich media. Rich media based advertisements enhance a user's experience while providing additional information about a service or product. As more and more users are rapidly adapting to internet marketing, the graphical icon tool provides access to rich media that captures and engages a user's attention while providing minimal changes to the search user interface. The tool allows rendering of dynamic non-content based rich media separate from the contents in a linked page associated with the advertisement without a user having to wade through the text available at the linked page.

It should be appreciated that the present invention can be implemented in numerous ways, such as method, apparatus or a system. Several inventive embodiments of the present invention are described below.

In one embodiment, a method for mixing rich media content with textual listings on a webpage is disclosed. The method includes identifying an advertisement that includes additional media content. A graphical icon is provided for the identified advertisement to indicate that additional media content is available for this advertisement. A dynamic content window is defined for the additional media content and is associated with the graphical icon. The dynamic content window is used to render the additional media content upon detection of a user action at the graphical icon. The additional media content includes rich media content related to the advertisement.

In another embodiment of the invention, a method for mixing rich media content with textual listings on a webpage is disclosed. The method includes receiving a plurality of advertisement parameters for booking an advertisement for a product, service or information about a product or service from an advertiser. Additional media content associated with the advertisement is obtained from the advertiser during the booking of the advertisement. The additional media content includes rich media content related to the advertisement. A dynamic content window is defined to render the additional media content. A graphical icon is provided for the identified advertisement to indicate availability of additional media content. The dynamic content window is associated with the graphical icon. The graphical icon is presented alongside the advertisement on the webpage and the additional media content is accessed through the dynamic content window in response to detecting a user action at the graphical icon.

In yet another embodiment, a system for mixing rich media content with textual listings on a webpage is disclosed. The system includes a user interface to receive and transmit search parameters associated with a search. The system also includes a server equipped with a search engine to receive the search parameters, identify a plurality of relevant listings that match the search parameters and return the relevant listings to the user interface. The server includes a repository for storing advertisement and additional media content associated with the advertisement. The search engine interacts with the repository to identify and return one or more advertisements associated with the search listings to the user interface. The search engine also identifies one or more of the identified advertisements having additional media content. A graphical icon generator available at the server is used to interact with the repository to identify the additional media content associated with the advertisement being returned with the search listings, generate a graphical icon for the advertisement having additional media content, define a dynamic content window for rendering the additional media content and associate the dynamic content window with the graphical icon. The graphical icon provides access to additional media content associated with an advertisement including rich media content. The rich media content enriches a user's search experience without distracting the user and the graphical icon provides an effective tool for an advertiser to capture a user's attention by providing access to rich media content for an advertisement.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings.

FIG. 3B illustrates a sample search results page with option to activate graphical icons associated with some of the advertisements, in accordance with one embodiment.

DETAILED DESCRIPTION

Broadly speaking, the embodiments of the present invention provide methods and computer implemented systems that enable mixing rich media content with textual listings on a webpage. A plurality of advertisement parameters associated with an advertisement is received from an advertiser. The advertisement parameters define the advertisement and are used for booking the advertisement. Additional media content associated with the advertisement is obtained from the advertiser. A dynamic content window is defined for rendering the additional media content. A graphical icon is provided for the advertisement to indicate that additional media content is available for the advertisement. The graphical icon is associated with the dynamic content to provide access to the additional media content in response to detecting a user action at the graphical icon.

The benefits of allowing access to rich media content through the graphical icon are numerous. It provides an alternate way of accessing additional media content associated with an advertisement without compromising a user's search experience. The graphical icon allows a user to enjoy rich media content thereby enriching a user's search-and-surf experience while providing minimal change to search user interface. As the space on the webpage is limited, the dynamic content window and the graphical icon provide an alternate tool for an advertiser to render additional information in a format that can capture a user's attention while taking minimum real-estate space. Further, controls are provided at the webpage to enable a user to activate or deactivate the graphical icon feature allowing a user to control access to additional media content so that the user's search-and-surf experience is not compromised.

Figure 1:
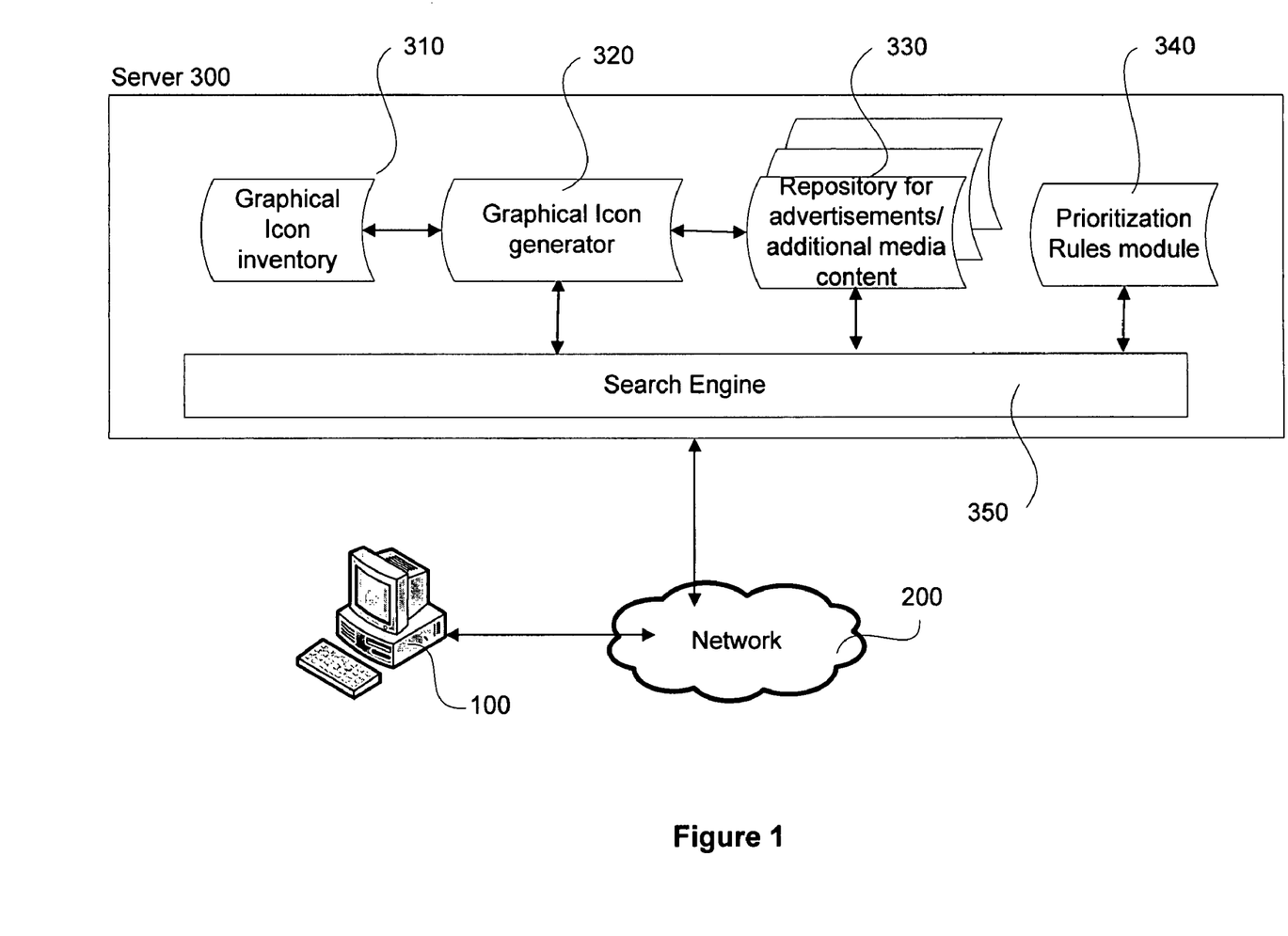
FIG. 1 illustrates a high-level block diagram of a system used in mixing rich media contents with textual listings on a webpage, in accordance with one embodiment.

FIG. 1 illustrates a high-level architecture of various functional elements of a computer system used in mixing rich media content with advertisements, in one embodiment of the invention. The system, as shown in FIG. 1, includes a user interface 100 to capture and transmit a plurality of search parameters for a search. The user interface is also used to capture a plurality of advertisement parameters and any additional media content associated with an advertisement from an advertiser for booking the advertisement. The user interface 100 is communicatively connected to a server 300 through a computer network 200, such as an Internet. The connection may be wired or wireless and may use any technology that allows the user interface 100 to interact with the server 300.

The server 300 includes a search engine 350 that is communicatively connected to the user interface 100 and is used to receive the search parameters, search the network 200, identify and return a plurality of search result listings matching the search parameters to the user interface 100. The search engine may also identify and return one or more advertisements associated with one or more of the search listings to the user interface along with the search results. One or more advertisements returned with the search results may include additional media content. The additional media content may include rich media. The advertisements and additional media content associated with the advertisements may be stored in a repository 330 and accessed by the search engine 350. In one embodiment, the repository 330 includes a plurality of advertisements and additional media content associated with one or more advertisements. In another embodiment, the advertisements and the additional media content for one or more advertisements are stored in separate repositories 330 and accessed by the search engine 350.

A graphical icon generator 320 available at the server 300 interacts with the repository 330 to identify an advertisement with additional media content and generates a graphical icon for the identified advertisement. The generated graphical icon may be stored in a graphical icon inventory 310 for future use. In one embodiment of the invention, the graphical icon inventory 310 is integrated with the repository 330. In another embodiment, the graphical icon inventory 310 is separate from the repository 330 and is communicatively connected to the graphical icon generator 320 to store and return one or more generated graphical icons.

The graphical icon generator 320 is also configured to define a dynamic content window (DCW) for rendering the additional media content and associate the DCW with the generated graphical icon for the advertisement having the additional media content. The graphical icon indicates the availability of additional media content for the associated advertisement. The graphical icon generator 320 returns the graphical icon and the DCW for the identified advertisement to the search engine 350 for including in the search results webpage. The graphical icon provides access to the additional media content through the DCW in response to detecting a user action at the graphical icon on the user interface 100.

The graphical icon generator may also be configured to provide controls to activate and/or deactivate the graphical icon. The controls are returned with the graphical icons to the search engine 350 along with the DCW for rendering on the webpage at the user interface 100. In one embodiment, the graphical icon returned to the search engine may already be activated so that when the graphical icon is presented at the user interface, a user is able to access the additional media content in response to detecting a user action at the graphical icon, such as mouse roll-over. In another embodiment, the graphical icon may be available but deactivated when rendered on the search results webpage. In this embodiment, the graphical icons may be either hidden or may be disabled. The controls available at the search results webpage are used to activate the graphical icons. The activation option may either display the hidden graphical icons or may enable them based on the status of the graphical icon the webpage. Once the graphical icons are activated, the controls may be used to deactivate the graphical icons associated with one or more advertisements. The deactivation option will either hide the graphical icons that are currently displayed on the webpage or disable them.

The system further includes a prioritization rules module 340 to provide rules for presenting the associated advertisements on the webpage. In one embodiment of the invention, the rules provide a set of ranking parameters that define the order in which the advertisements are presented on the webpage.

Figure 2:
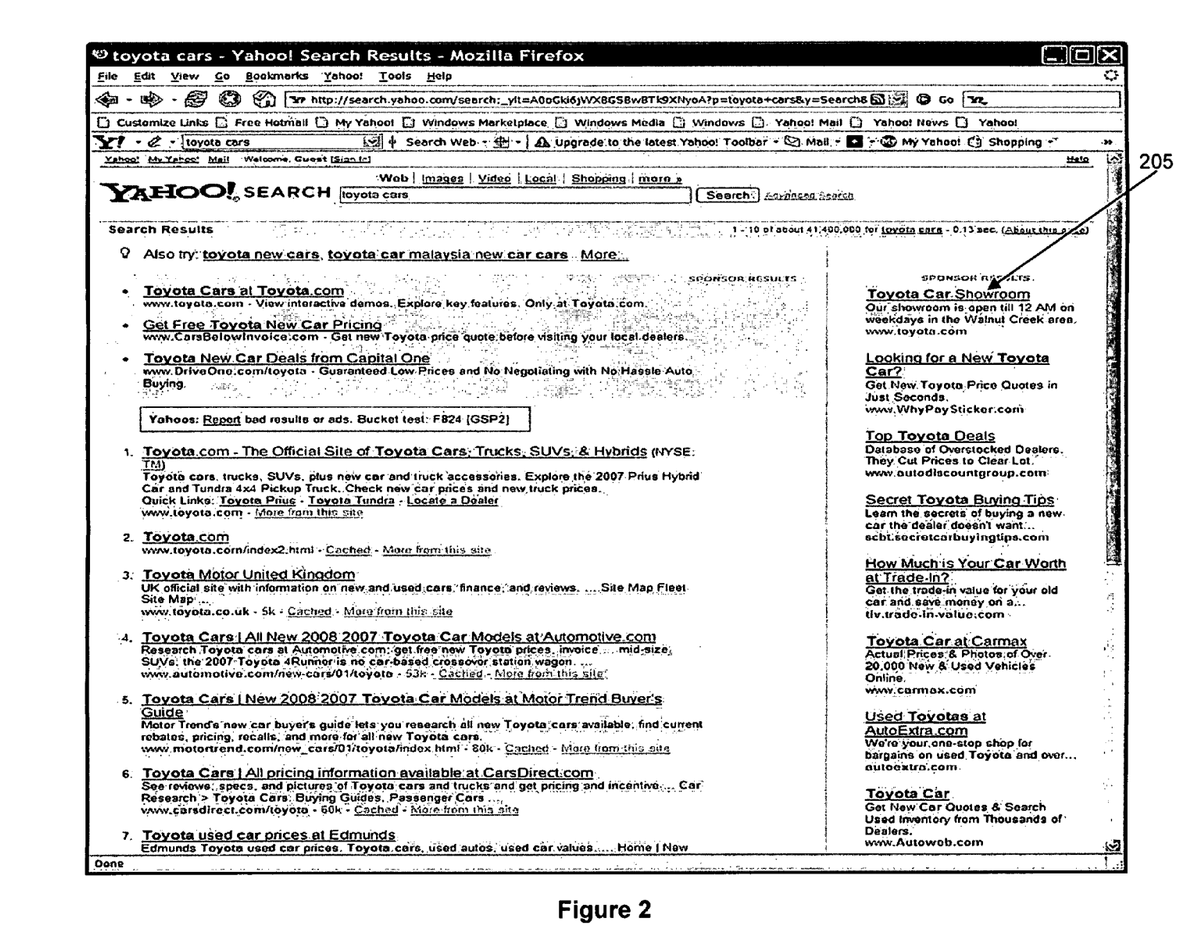
FIG. 2 illustrates a sample search results page with a plurality of sponsored advertisements, in accordance with one embodiment.

FIG. 2 illustrates a sample search results page returned in response to a search initiated by a user, in one embodiment of the invention. A user, searching for a product, service or information about a product or service, provides a plurality of search parameters at a user interface. The user interface transmits the search parameters over a network, such as an Internet, to a server. A search engine on the server receives the search parameters, searches the Internet and returns a plurality of search result listings that match the search parameters on a search results webpage. The search engine may also return one or more advertisements 205 along with the search results. The advertisements 205 are presented in the form of sponsor results in a distinct region on the webpage and clearly identified accordingly so as to distinguish the sponsor results from the search results.

Figure 3A:
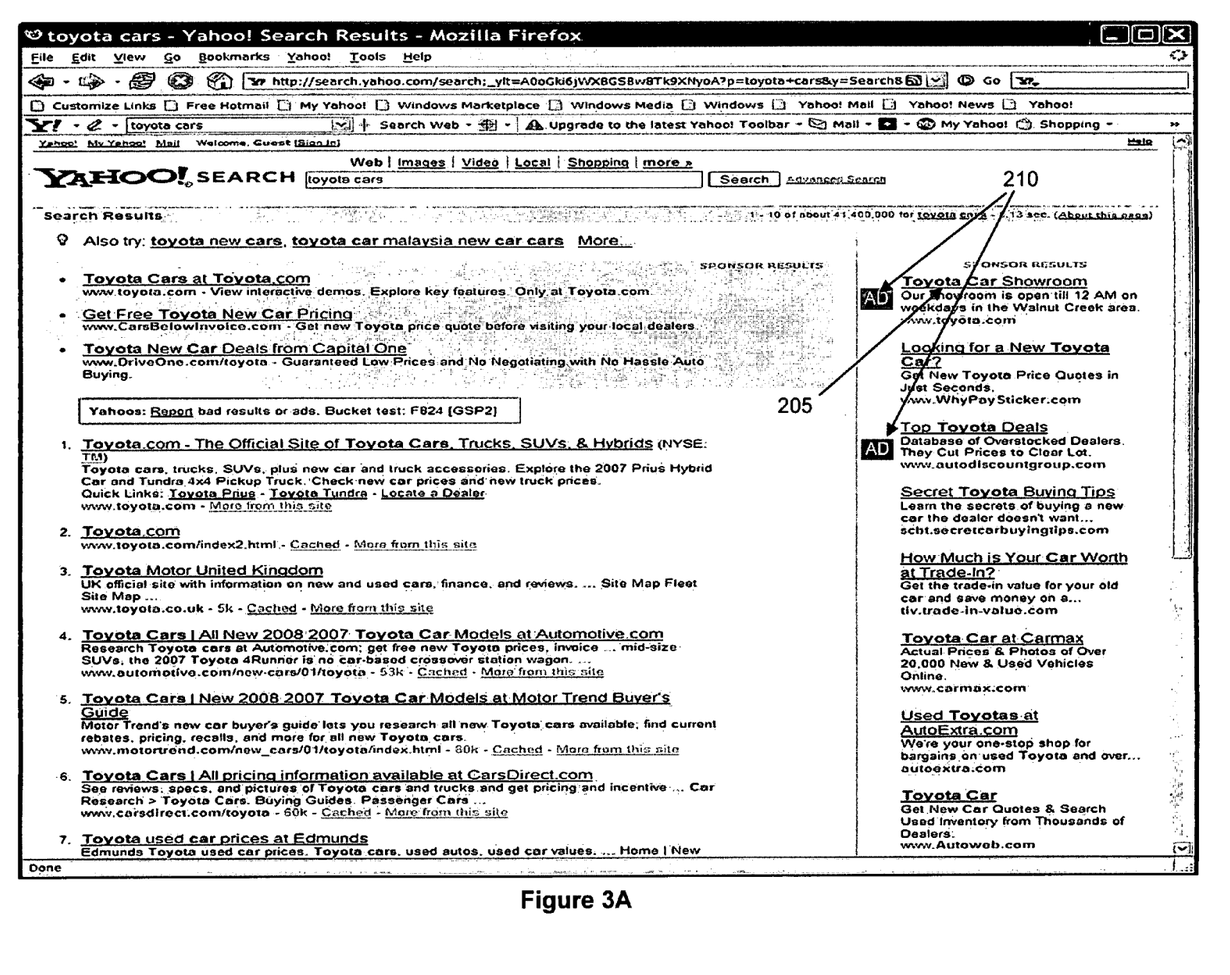
FIG. 3A illustrates a sample search results page with graphical icons associated with some of the advertisements, in accordance with one embodiment.

One or more advertisements on the search results page may include additional media content associated with it. In this case, a graphical icon generator 320 on the server interacts with a repository of advertisements, identifies advertisements 205 included with the search results that have additional media content and generates a graphical icon 210 for each of the identified advertisements 205 with additional media content. A dynamic content window is generated for rendering each of the identified additional media content. The graphical icon 210 for each advertisement 205 is then associated with the corresponding dynamic content window. The graphical icon 210 and the additional media content are then transmitted to the user interface along with the advertisement 205 and the search results, through the search engine. The graphical icon 210 is then presented alongside each of the advertisements 205 that include additional media content, as illustrated in FIG. 3A. In this embodiment, the graphical icon 210 is already activated and enables access to the additional media content in response to detecting a user action at the graphical icon. In one embodiment, a mouse roll-over on the graphical icon presented on the webpage enables access to the additional media content through the dynamic content window. The user action is not restricted to a mouse roll-over but may include other forms, such as clicks, double-clicks, etc, to name a few.

In another embodiment, a graphical icon generator provides one or more controls to access the graphical icons 210 presented at the search results webpage, as illustrated in FIG. 3B. In this embodiment, one or more graphical icons associated with one or more of the advertisements rendered on the webpage come with deactivated status. With the deactivated status, the graphical icons associated with some of the advertisements rendered on the webpage may be present but not enabled or may be hidden. The controls provided at the search results webpage will include an option to activate the graphical icons. In this embodiment, the graphical icon generator identifies one or more advertisements being returned with the search results that have additional media content associated with it. Upon identifying one or more advertisements having additional media content to render, the icon generator generates graphical icons and controls and returns these icons and controls along with the corresponding advertisements with the search results to the user interface. The controls available at the user interface enable activation/deactivation of the graphical icons on the webpage. In one embodiment, the graphical icons are available at the webpage but are not enabled or are hidden. In this embodiment, the control provides the option to activate the graphical icons. When activated, the graphical icons will be displayed or enabled so that the graphical icon may provide access to the additional media content in response to detecting a user action at the graphical icon. Once the graphical icons are activated, the controls provide the option to deactivate the graphical icons. When deactivated, the graphical icons are either disabled or hidden so that any use action at the graphical icon will be disabled.

In one embodiment, the controls are returned as a radio button. The embodiments of the invention are not restricted to radio button controls but can use other forms of controls, such as buttons, check-boxes, etc. to provide the same functionality as the radio button control. In cases where the graphical icons are hidden, the controls also indicate that one or more advertisements presented on the webpage include additional media content. Alternately, when the advertisements presented on the webpage do not include any additional content, then no controls are returned by the graphical icon generator. When the graphical icons are activated, the control provides the deactivation option and when the graphical icons are deactivated, the control provides the activation option.

FIG. 3B illustrates an embodiment of the invention with sample search results page with a control option 215 to activate graphical icons. As shown, the search results webpage includes a plurality of search listings returned by a search engine in response to a plurality of search parameters provided by a user. The search results webpage includes a plurality of advertisements 205 returned with the search results.

As mentioned earlier, the presence of the control option 215 indicates that there are one or more advertisements on the search results webpage that include additional media content for rendering. As can be seen, the graphical icons are available but are hidden and the control option 215 provides the ability to activate the graphical icons and display them so as to access the additional media content on the webpage.

Figure 3C:
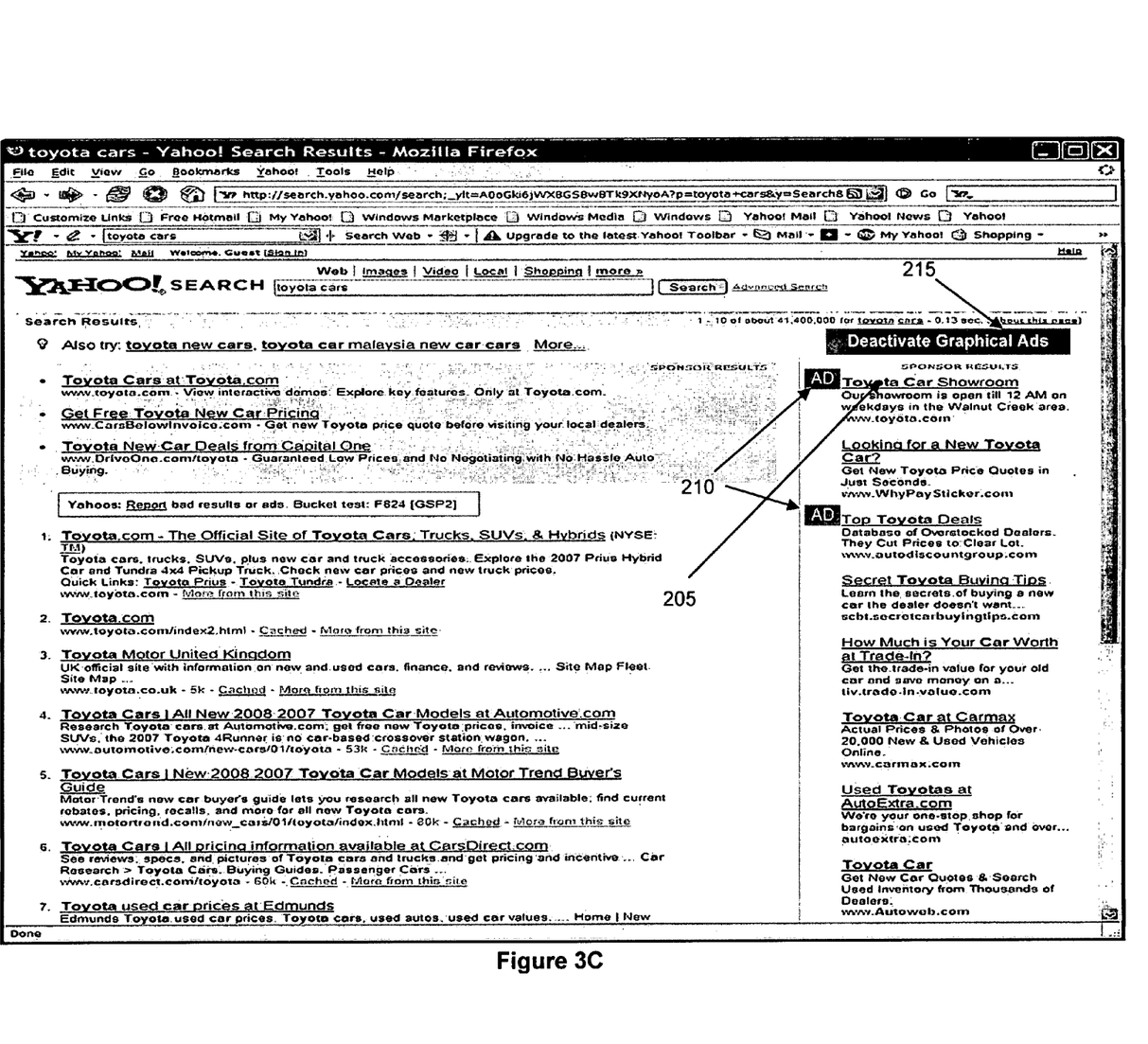
FIG. 3C illustrates a sample search results page with graphical icons associated with some of the advertisements and an option to deactivate the graphical icons, in accordance with one embodiment of the invention.

FIG. 3C illustrates an embodiment where the graphical icons available for some of the advertisements are activated and rendered. The control option available on the webpage provides the ability to deactivate the graphical icons, as they are already activated. The deactivate option may either hide the graphical icons or just disable them.

Figure 4A:
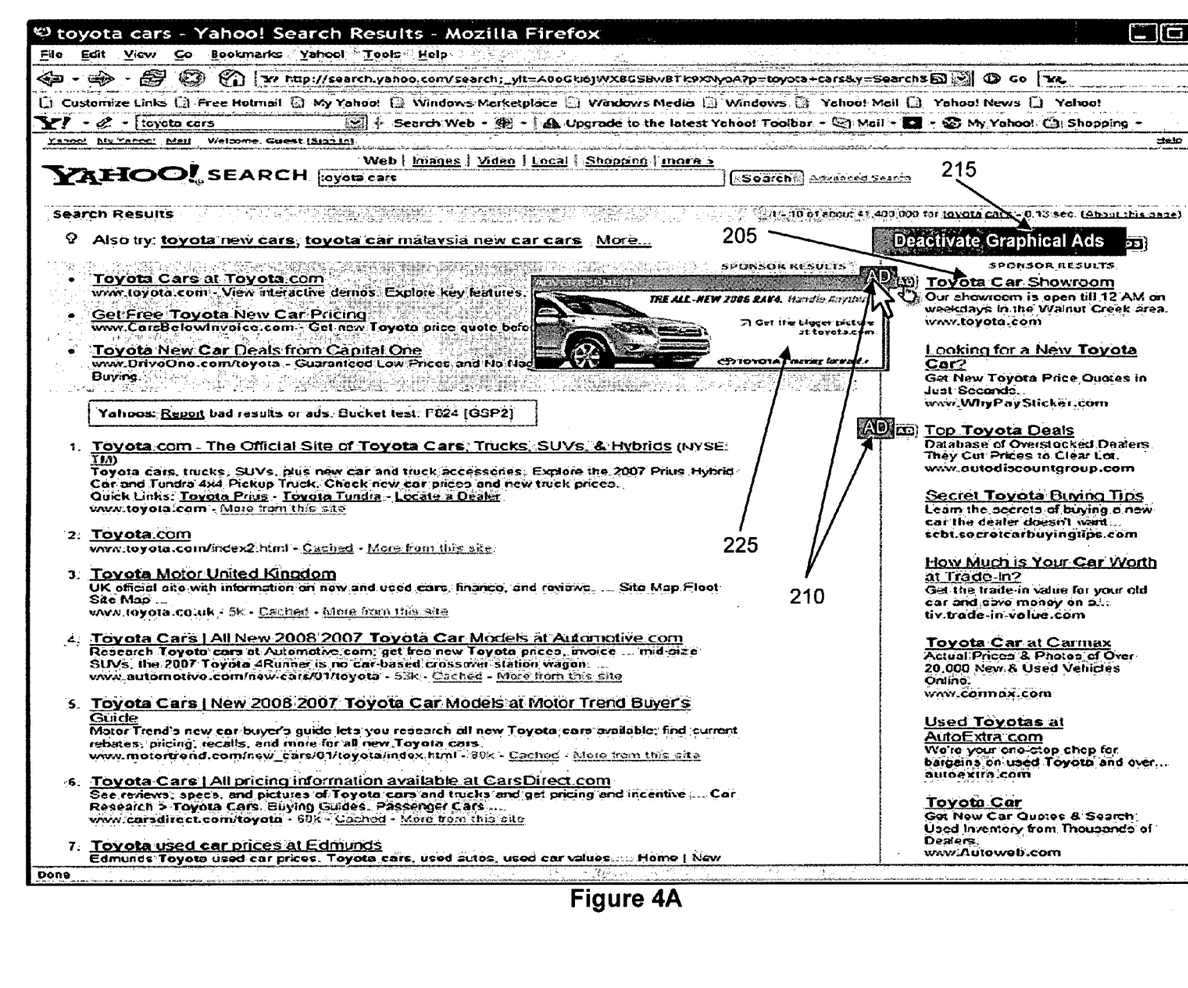
FIGS. 4A and 4B illustrate alternate embodiments of a dynamic content window associated with an advertisement, in accordance with one embodiment of the invention.

FIG. 4A illustrates a search result page showing a dynamic content window 225 rendering additional media content associated with an advertisement. In this embodiment, the search results webpage includes a search result listing along with a plurality of advertisements 205. Some of the advertisements 205 may include additional media content associated with it. Graphical icons 210 indicating availability of additional media content are rendered alongside the corresponding advertisements. The graphical icons 210 may have been activated by default when the search results and associated advertisements 205 were rendered or may have been activated by use of a control option 215 available at the webpage. A user action, such as mouse roll-over, at a graphical icon 210 available for an advertisement 205 provides access to a dynamic content window (DCW) 225 on which additional media content is rendered. The DCW 225 is configured to render any type of additional media content. The additional media content may include rich media, such as video, flash, flash video, image, text, JavaScript, graphical content, to name a few. Further, the DCW may be configured to include one or more nested active links to access one or more additional DCW and/or a home page of an advertiser. The additional DCWs may provide additional information related to the advertisement and may include rich media content that is either of the same type as the content rendered in the DCW or of a different type. The nesting of additional DCWs enables an advertiser to provide rich media content of various types to a user enhancing the user's experience while capturing the user's attention to the advertisement.

Although embodiments of the invention have been described with a single type of graphical icon 210 representing additional media content, it should be understood that the embodiments are not restricted to a single graphical icon representation to represent additional media content. A plurality of unique graphical icon representations may be defined based on type of additional media content or based on type of advertisement 205. In one embodiment, the graphical icon generator may define a graphical icon 210 based on the type of rich media to indicate the type of additional media content available for a particular advertisement 205. For instance, an advertisement may include video content. In this case, a unique graphical icon representative of the video content may be defined in order to indicate the presence of the video content. In another instance, an advertisement may include animation content, in which case an appropriate graphical icon representation different from a video content representation may be defined to indicate that the advertisement includes animation content. In another embodiment, more than one type of additional media content may be defined for an advertisement 205. In such a case, the embodiments are not restricted to a single graphical icon 210 for representing the availability of additional media content for an advertisement 205 but may include a plurality of graphical icons 210, each using a different graphical icon representation to define different type of additional media content available for the particular advertisement. In one embodiment wherein the additional media content includes more than one type of rich media, more than one graphical icon 210 may be provided at the webpage to enable rendering of different types of rich media. For instance, an advertisement having a video component, animation component and static component may be represented by three different graphical icons 210 on the webpage, each graphical icon 210 representative of the type of component available for the advertisement.

The generated graphical icons 210 may be stored in a graphical icon repository. In one embodiment, the graphical icon inventory is on the same server as the advertisement and additional media repositories. In another embodiment, the graphical icon inventory is on a different server than the advertisement and additional media repositories but accessible through the network. In yet another embodiment, the graphical icon inventory is integrated with the advertisement and additional media inventories. Irrespective of where the generated graphical icons 210 are stored, the graphical icon generator interacts with the graphical icon inventory and the advertisement inventory during the searching and rendering of the search results. Along the same lines, an inventory of advertisements 205 may be stored in a single repository or may be stored in multiple repositories communicatively connected and accessed by the graphical icon generator and the search engine. The plurality of repositories may be on the same server 300 that is hosting the search engine or may be distributed across different servers and accessed by the search engine through the Internet.

Figure 4B:
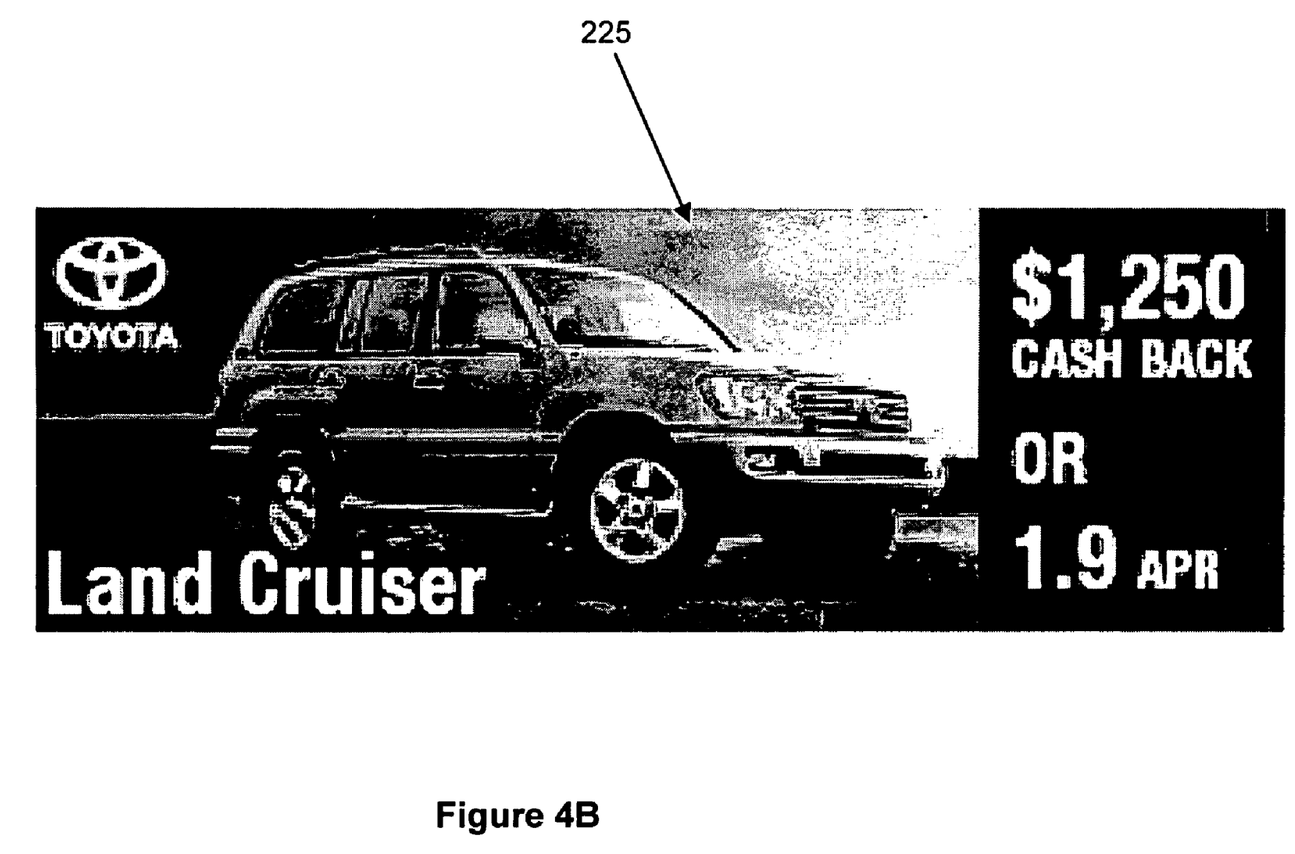

The additional media content for an advertisement is rendered using a DCW 225. The DCW 225 is generated by the graphical icon generator at the server for rendering the additional media content. The DCW 225 may be configured to render the additional media content using various configurations. In one embodiment, the DCW 225 may be configured to render the additional media content on the search results webpage alongside the advertisement in a separate dynamic content window, as illustrated in FIG. 4A. In another embodiment, the DCW 225 may be rendered as a new window, as illustrated in FIG. 4B. In yet another embodiment, the DCW 225 may be rendered in the space occupied by the corresponding advertisement by overlaying over the text of the advertisement. In another embodiment, the contents of the DCW 225 are swapped with the contents of the corresponding advertisement. In the case of the swapping configuration, the contents in the DCW 225 are displayed in the space used by the advertisement and the contents of the advertisement are displayed in the DCW 225.

Figure 5:
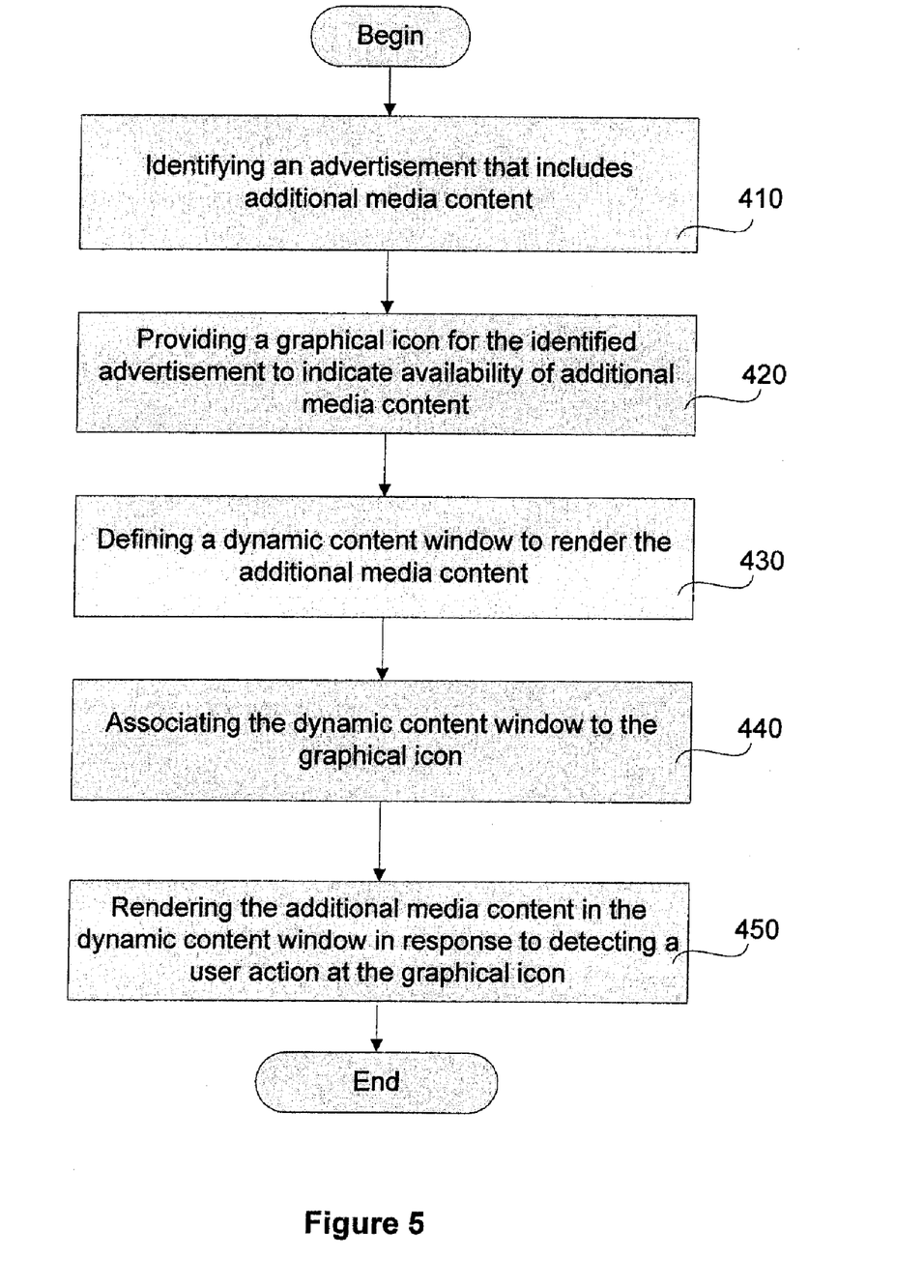
FIG. 5 illustrates a flow chart of process operations involved in mixing rich media content with textual listings on a web page, in accordance with one embodiment of the invention.

With the above detailed description of the DCW 225 and graphical icons 210, a method for mixing rich media with textual listing on a search results webpage will now be described with reference to FIG. 5. The method begins with identifying an advertisement having additional media content associated with it, as illustrated in operation 410. During a time of booking an advertisement, an advertiser may have included additional media content, such as rich media to provide additional information related to the advertisement and to capture a user's attention. A search engine at a server receives a plurality of search parameters for a search, searches a network, such as an Internet, identifies a plurality of listings that match the search parameters and returns the search results to the user interface in a search results webpage. The search engine also identifies one or more advertisements that are to be returned with the search results. The search engine returns the identified advertisements along with the search results in a search results webpage for rendering at the user interface. The advertisements that are returned with the search results may be related to the search parameters or may be random advertisements provided by an advertiser. The advertisements are rendered on the webpage as sponsor results to distinguish them from the search results.

During the retrieval of the advertisements, a graphical icon generator identifies one or more advertisements returned with the search results with additional media content and interacts with a repository of additional media content to retrieve the additional media content for those advertisements and return the corresponding advertisements, additional media content associated with the corresponding advertisements and search results to the user interface through the search engine. The graphical icon generator generates a graphical icon for each of the advertisements associated with additional media content, as illustrated in operation 420. A dynamic content window (DCW) is defined by the graphical icon generator for rendering each of the additional media content, as illustrated in operation 430. Each of the dynamic content windows is associated with the corresponding graphical icon, as illustrated in operation 440. The graphical icon is rendered on the webpage alongside the corresponding advertisement. The one or more graphical icons are activated either through a control option provided at the webpage or comes activated when the graphical icons are rendered on the webpage. The method concludes with the additional media content being rendered at the webpage through the corresponding dynamic content window in response to detecting a user action at the graphical icon, as illustrated in operation 450.

Figure 6:
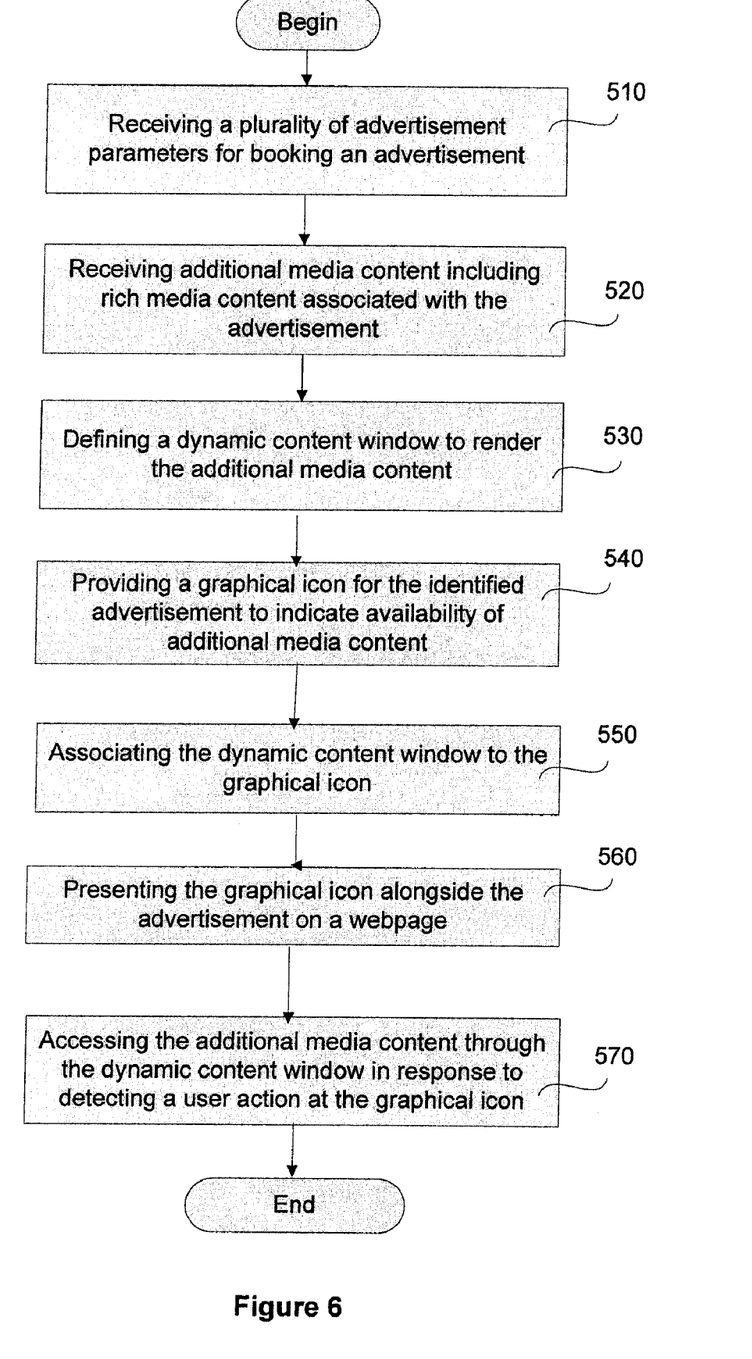
FIG. 6 illustrates a flow chart of process operations involved in mixing rich media content with textual content in a web page, in accordance with an alternate embodiment of the invention.

An alternate embodiment of a method for mixing rich media content with the textual listing is illustrated in FIG. 6. The method begins with a plurality of advertisement parameters being received at a server for booking an advertisement, as illustrated in operation 510. The advertisement parameters are provided by an advertiser using a user interface. If an advertiser wishes to include rich media for the advertisement in addition to the advertisement parameters, then the advertiser provides the rich media in the form of additional media content. The additional media content for the advertisement is received through the user interface at the server along with the advertisement parameters, as illustrated in operation 520. The advertisement parameters define the advertisement and additional media content provides additional information related to the advertisement. The additional media content may include rich media in the form of video, flash, flash video, JavaScript, text, image, graphical content, etc. that will enhance a user's search experience.

Upon receipt of additional media content for an advertisement, a graphical icon generator at the server defines a dynamic content window (DCW) for rendering the additional media content, as illustrated in operation 530. The DCW is configured to render any type of rich media associated with the advertisement. The content in the DCW may be tailored based on one or more user parameters. The user parameters define the preference of a user performing the search, such as user interest, age, gender, geo location, income level, favorite color, food preference, to name a few. It should be noted that the contents in the DCW are decoupled from the contents in the advertisement. For instance, the contents in the DCW may be related to the advertisement but may include information that is of a different type or format than the contents in the advertisement. DCW, thus, provides a tool for the advertiser to render decoupled additional dynamic content information about an advertisement without having to book another advertisement or incurring additional costs.

A graphical icon is generated for the advertisement by the graphical icon generator to indicate that additional media content is available for the advertisement, as illustrated in operation 540. The DCW is associated with the generated graphical icon, as illustrated in operation 550 and the graphical icon is returned along with the associated advertisement and search results in response to a search initiated by the user. By associating the DCW with the graphical icon, the additional media content associated with the advertisement is accessed when the graphical icon is enabled. The advertisement and the corresponding graphical icon are presented on a webpage along with search results, as illustrated in operation 560.

The presentation of the advertisements and the corresponding graphical icon on the webpage may be based on some ranking and prioritization. In one embodiment of the invention, the ranking and prioritization of the advertisements may follow a set of pre-defined prioritization rules that define an advertiser's and a host's objective. The host, in this application, is an entity that hosts a server on which a search engine is available. In this embodiment, the search engine, upon receiving one or more of the advertisements from a graphical icon generator for rendering on a search results webpage, interacts with a prioritization rules module at the server to obtain the rules for ranking and prioritizing the advertisements included on the webpage. The prioritization rules module may include one or more ranking parameters and associated logic to rank the advertisements to be presented on the webpage. For instance, a prioritization rule may include logic to rank an advertisement based on advertisement fee paid by the advertiser for the advertisements with the advertisement with a higher advertisement fee placed at a higher level than an advertiser paying a lower advertisement fee. In this case, the higher ranked advertisement will be rendered at the top of the search results webpage with the lower ranked advertisements rendered further down. In one embodiment, the prioritization rule is set at the time an advertiser provides advertisement parameters for booking an advertisement. The advertisements and the associated graphical icons are rendered on the webpage in the order of ranking based on the prioritization rules.

The method concludes with the additional media content associated with the advertisement being accessed by enabling the corresponding DCW at the graphical icon associated with the advertisement on the webpage, as illustrated in operation 570. The DCW may be enabled in response to detecting a user action, such as a mouse roll-over, at the corresponding graphical icon rendered on the webpage.

Although the various embodiments of the invention have been defined with respect to advertisements on a search results page, the invention is not restricted to a search results webpage but can be extended to any webpage where an advertisement may be placed including, but not limited to, webpage, content match webpage, web logs (blogs), social network webpages, etc.

Thus, embodiments of the invention provide a tool to access rich media content along with textual listing on a webpage enhancing a user's search experience without taking additional real-estate space on the webpage. The advertiser is able to provide rich media content for an advertisement without compromising textual content. The additional media content may be time-based content and may be updated periodically to include relevant information for an advertisement without having to go through the process of booking another advertisement. For instance, the time-based content may include a promotional offer from a dealer, such as a special on a particular automobile model that is valid for a week. These time-based contents are defined by the advertiser during the time of booking of the advertisement or at any time over the period of the advertisement.

The present invention may be used to provide advertisement metrics for an advertiser so that the advertiser may be able to optimize the advertisement for a better return on investment. The advertiser may be able to obtain advertisement metrics in response to detecting a user action at the graphical icon, such as click-through, double click, etc., to determine the effectiveness of the advertisement. A host of a search engine may also be able to use the advertisement metrics to determine monetization for each advertisement.

It will be obvious, however, to one skilled in the art, that the present invention may be practiced without some or all of these specific details. In other instances, well known process operations have not been described in detail in order not to unnecessarily obscure the present invention.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A computer-implemented method for mixing rich media content with textual listings on a webpage, comprising:
    identifying an advertisement with additional media content to render on the webpage;
    providing a graphical icon for the identified advertisement, the graphical icon indicating additional media content available for the identified advertisement; and
    associating a dynamic content window to the graphical icon, the dynamic content window configured to render the additional media content associated with the identified advertisement, the rendering of the additional media content in the dynamic content window controlled in response to detecting a user action at the graphical icon, wherein the additional media content includes rich media content related to the advertisement, and wherein associating further includes,
        identifying the additional media content associated with the advertisement;
        defining the dynamic content window for rendering the additional media content; and
        linking the dynamic content window to the graphical icon associated with the identified advertisement.

2. The method of claim 1, wherein the availability of additional media content for an advertisement is defined by an advertiser during booking of the advertisement.

3. The method of claim 1, further including providing controls to activate or deactivate the graphical icon, wherein the activate control enabling rendering of the graphical icon and deactivating hiding the graphical icon presented alongside the identified advertisement on the webpage.

4. The method of claim 1, wherein the content in the dynamic content window is tailored based on one or more user parameters, wherein the user parameters define the preference of a user, the user parameters including user interest, age, gender, geo location, income level, favorite color, food preference.

5. The method of claim 1, wherein the user action at the graphical icon includes one of click, roll-over, or double-click.

6. The method of claim 1, wherein the graphical icon is available on any webpage where an advertisement can be placed including a webpage, search result webpage, content match webpage, web logs (blogs), social network webpage.

7. The method of claim 1, wherein the dynamic content window is configured to render the contents in one of a plurality of configurations, the plurality of configurations including a dynamic content window separate from the content of the displayed advertisement, in a separate dynamic content window at the same location as the advertisement by overlay, or dynamic content window separate from the advertisement content wherein the content of the dynamic content window is swapped with the content of the advertisement while rendering the dynamic content window along with advertisement window simultaneously.

8. The method of claim 1, wherein the contents of the dynamic content window include time-based promotional offers defined by an advertiser associated with the advertisement.

9. The method of claim 1, wherein the graphical icon is configured to provide advertising metrics used in determining monetization for the advertisement.

10. A computer-implemented method for mixing rich media content with textual listings on a webpage, comprising:
    identifying an advertisement with additional media content to render on the webpage;
    providing a graphical icon for the identified advertisement, the graphical icon indicating additional media content available for the identified advertisement; and
    associating a dynamic content window to the graphical icon, the dynamic content window configured to render the additional media content associated with the identified advertisement, the rendering of the additional media content in the dynamic content window controlled in response to detecting a user action at the graphical icon, wherein the additional media content includes rich media content related to the advertisement, the additional media content in the dynamic content window are multimedia contents of type including video, flash, flash video, images, text, JavaScript, and graphical contents.

11. The method of claim 10, wherein the dynamic content window may include one or more nested active links to one or combination of a home page of an advertiser or one or more of additional dynamic content windows associated with the advertisement, the additional dynamic content windows including one of additional media content of the same type as the dynamic content window or of different type.

12. A computer-implemented method for mixing rich media with textual listings on a webpage, comprising:
   receiving a plurality of advertisement parameters from an advertiser for booking an advertisement, the advertisement identifying one of a product, service or information about a product or service associated with the advertiser;
   obtaining additional media content associated with the advertisement from the advertiser, the additional media content including rich media content related to the advertisement;
   defining a dynamic content window for rendering the additional media content of the advertisement,
   providing a graphical icon for the identified advertisement, the graphical icon indicating availability of additional media content for the advertisement and configured to provide access to the additional media content in response to detection of a user action;
   associating the dynamic content window with the graphical icon, the dynamic content window configured to render the additional media content of the advertisement in response to detection of a user action at the graphical icon; and
   presenting the associated graphical icon alongside the advertisement on the webpage, the presentation of the graphical icon enabling access to the additional media content on the webpage, the advertisement being in text form and is presented in response to a query search term match,
   wherein associating the dynamic content window further includes,
      linking the dynamic content window to the graphical icon associated with the identified advertisement.

13. The method of claim 12, wherein the additional media content includes multimedia contents of type including one or more of video, flash video, images, flash, text, JavaScript, graphical contents.

14. The method of claim 13, wherein additional media content includes time-based promotional content associated with the advertisement and is de-coupled to the content in the advertisement.

15. The method of claim 13, wherein the dynamic content window may include one or more nested active links to one or combination of a home page of an advertiser and one or more of additional dynamic content windows associated with the advertisement, wherein the additional dynamic content windows including additional media content of one of the same type as the dynamic content window or of a different type.

16. The method of claim 12, further including providing controls to activate and de-activate graphical icons, wherein activation displays the graphical icon and deactivation hides the graphical icon on the web page.

17. A computer-implemented system for presenting rich media with textual listings on a webpage, comprising:
   a user interface to receive and transmit a plurality of search parameters associated with a search, a plurality of advertisement parameters and additional media content associated with an advertisement for booking an advertisement;
   a search engine on a server communicatively connected to the user interface and configured to,
      receive the plurality of search parameters, identify and return a plurality of search listings in text form that match the plurality of search parameters;
      identify and return one or more advertisements associated with the plurality of search listings, wherein the advertisements are stored in a repository accessible to the server;
   a graphical icon generator on the server communicatively connected to the search engine and configured to,
      identify additional media content associated with one or more of the identified advertisements, the additional media content stored in a additional media repository accessible to the graphical icon generator;
      define a dynamic content window to render each of the identified additional media content;
      generate a graphical icon for each of the advertisements having additional media content,
      associate each of the dynamic content window to the corresponding graphical icon, the graphical icon indicating the availability of the additional media content; and
      return the graphical icon and the associated dynamic content windows to the search engine for presenting at the user interface, the graphical icon providing access to the additional media content in response to detection of a user action at the graphical icon on the user interface,
      wherein associate each of the dynamic content window further includes,
         linking each of the dynamic content window to the graphical icon associated with corresponding one or more of the identified advertisements.

18. The system of claim 17, wherein the additional media repository is integrated with the repository of advertisements.

19. The system of claim 17, wherein the graphical icon generator further configured to provide controls to activate and de-activate the graphical icon associated with the one or more advertisements presented on the webpage.

20. The system of claim 17, further including a graphical icon inventory to store the generated graphical icons for each advertisement having additional media content, the graphical icon inventory configured to interact with the graphical icon generator to receive and return one or more of the graphical icons.

21. The system of claim 17, further including a prioritization rules module configured to interact with the search engine to rank and prioritize the advertisements based on a set of pre-defined rules.

* * * * *